UNITED STATES PATENT OFFICE 2,667,515

PREPARATION OF ALKYL MERCAPTANS

Leland K. Beach, Mountainside, and Allan E. Barnett, Westfield, N. J., assignors to Standard Oil Development Company, a corporation of Delaware No Drawing. Application September 30, 1950, Serial No. 187,830

3 Claims. (Cl. 260—609)

This invention relates broadly to a novel process for the production of alkyl mercaptans. More particularly, it relates to an improved catalytic process for converting a reaction mixture containing appreciable amounts of dialkyl sulfides together with hydrogen sulfide to the corresponding alkyl mercaptans over a cadmium sulfide-alumina catalyst at elevated temperatures.

This new catalytic process is for production of the lower molecular weight alkyl mercaptans. The process essentially consists of passing a reaction mixture containing appreciable quantities of the dialkyl sulfides and hydrogen sulfide over a catalyst comprising solid cadmium sulfide supported on activated alumina. A preferred method is to employ as free a mixture of alcohol and the dialkyl sulfide having the same alkyl radical. The process has been found to be especially attractive for the preparation of methyl mercaptan from a mixture of dimethyl sulfide and methanol. This particular mercaptan has been found to be among the most difficult of this type of compounds to produce from methanol and hydrogen sulfide.

It has previously been known that the lower molecular weight alkyl mercaptans, for instance, those having from 1 to 8, inclusive, carbon atoms, are generally prepared by reacting the corresponding aliphatic alcohol with hydrogen sulfide using any one or a mixture of a wide variety of catalysts, those found to be of use, including thoria, zirconia, uranous oxide, oxides of tungsten and molybdenum, chromic oxide and alumina. A number of these catalysts, including alumina, are reported to give poor results.

In carrying out a catalytic reaction for the preparation of an alkyl mercaptan, for example, methyl mercaptan from methyl alcohol, there are a number of reactions which must be considered. The following equations show two of the more important reactions:

$$CH_3OH + H_2S \rightarrow CH_3SH + H_2O \quad (1)$$
$$2CH_3SH \rightarrow CH_3-S-CH_3 + H_2S \quad (2)$$

With regard to these two reactions, some catalysts are quite selective. A thoria-silica catalyst, which gives fairly good results in producing methyl mercaptan from methyl alcohol, tends to form the corresponding sulfide in substantial amounts, but does not catalyze the reaction for conversion of dimethyl sulfide to methyl mercaptan. Thus, the by-product dimethyl sulfide which is formed in Reaction 2 above cannot be utilized by recycle over such a catalyst when methyl mercaptan is made from methanol and hydrogen sulfide over thoria-silica and similar type catalysts. This is a decided disadvantage since there is no large scale use for dimethyl sulfide as a chemical.

A highly useful catalyst has now been found which enables this recycling operation to be carried out as well as affords other advantages in operations for producing the alkyl mercaptans and, especially, methyl mercaptan. This is particularly true since the most desirable raw materials for making such alkyl mercaptans as methyl mercaptan are the corresponding alcohol and hydrogen sulfide. These starting reactants are both quite cheap and readily available.

Furthermore, dialkyl sulfides are present in quantity in refinery streams and could be made available for conversion to mercaptans by catalytic treatment with $H_2S$ alone in the absence of any alcohol.

This invention comprises a vapor phase operation from which the mercaptan and by-product water (from the alcohol if alcohol is used) are the only ultimate products, the unreacted alcohol and $H_2S$ and by-product ether and organic sulfide being recycled. It has been found that cadimum sulfide supported on activated alumina catalyzes both Reaction 1 and the reversal of Reaction 2 outlined above. For example, at temperatures of about 400° C. and three seconds contact time, this catalyst converts methanol and about 10 volumes of $H_2S$ completely to methyl mercaptan and dimethyl sulfide. It also converts dimethyl sulfide to methyl mercaptan in a 70% yield and 100% selectivity. These two outstanding catalytic actions are conveniently employed in an over-all integrated process which is impossible with other less effective catalysts.

The process can be used for the production of the lower molecular weight alkyl mercaptans such as methyl, ethyl, propyl, butyl, amyl, hexyl, heptyl, and octyl mercaptans, and even for aryl mercaptans, such as phenyl and the like. The feed can also consist of mixtures of alcohols and sulfides falling in the appropriate molecular weight ranges, in which case, the final product will consist of a mixture of mercaptans which may be separated into the components or used as a mixture.

The vapor-phase reaction is preferably carried out at catalyst temperatures between 300° C. to 500° C. The optimum temperature is about 375° C. to 425° C. for preparation of the lower molecular weight mercaptans such as methyl mercaptan. These temperatures are considered to give the best practical balance between yield and selectivity values. Contact times for reactants with the catalysts are preferably between 1.0 to 10 seconds, with variations depending on temperature, catalyst reactivity, and other reaction conditions.

The cadmium sulfide-alumina catalyst can be employed either as a solid bed catalyst or in a fluidized type of catalytic process. Thus, the catalytic bed can be contacted with the feed as fixed bed, or as a moving bed of finely divided catalyst in a fluid or transfer line reactor.

Pressures varying from atmospheric and either higher or lower than atmospheric are in the range of operability of the process. Increased pressures of 5 to about 50 atmospheres can be employed, always with attention to maintaining the reaction in the vapor phase. The maximum pressure which is to be used thus depends on the reaction temperatures, the boiling ranges, and the partial pressures of the reactants as well as those of the products.

As far as the relative ratios of reactants which can best be employed, a ratio of hydrogen sulfide to mixed alcohol and organic sulfide or to organic sulfide alone of between 1 to 1 and 100 to 1 is within the scope of this invention. For optimum results, the experimental results indicate the use of an excess of hydrogen sulfide. A ratio of 10 moles per mole of organic reactant has been found to be satisfactory, this ratio being an efficient balance between the increased conversion obtained by excess hydrogen sulfide and the adverse economic aspects of recycling large excesses of one reactant.

The catalysts with which the process is primarily concerned, and which are critical for obtaining the advantages of the process over other methods for producing mercaptans, consist essentially of cadmium sulfide and alumina. The cadmium sulfide and alumina are necessarily present for the catalytic activity required to convert the sulfide to the mercaptan, since cadmium sulfide by itself, as the major ingredient, upon an inert base catalyzes the reverse reaction in which the mercaptan becomes converted to the dialkyl sulfide. The cadmium sulfide is therefore used as the minor ingredient, e. g., 2 to 30% by weight of the total catalyst. The catalysts may be prepared either by precipitation of cadmium sulfide on an alumina base, or by impregnating solid alumina with cadmium salt solutions. The cadmium is later converted to cadmium sulfide in the presence of excess $H_2S$. High temperature treatment of the prepared catalyst is not required, ordinary low temperature drying being adequate to produce an active catalyst. The type of alumina used is not particularly critical, although it should be of the kind having some "activated" characteristics. Small amounts of other substances, such as sodium and potassium salts, may also be present without adversely affecting the catalyst.

It is to be understood that there can be used as organic reactant feed either the relatively pure aliphatic alcohol or the dialkyl sulfide or a mixture of the two such as would naturally occur in a process using the alcohol as the primary reactant and obtaining at least a small amount of the sulfide in the product stream as a by-product. The relatively very small amount of dialkyl ether normally obtained may also be recycled.

Following the passage of the reactants over the heated catalyst, the reaction mixture is cooled sufficiently to condense out the normally liquid products. It is to be noted that water is a by-product only when alcohol is used and that its amount depends directly on the amount of alcohol in the feed. Where dialkyl sulfide is the sole organic feed, no water is present in the products. The water and at least a part of the unreacted alcohol will ordinarily be condensed out as liquid, while the hydrogen sulfide, mercaptan, a part of the alcohol, and the organic sulfide remain gaseous. The mercaptan vapors can subsequently be separated from the other products by rectification, or by scrubbing with an alkaline agent, or with a hydrocarbon liquid such as naphtha, kerosene, or a gas oil fraction, in which it shows preferential solubility. A combination of separation steps will usually be necessary, especially with the lower-boiling products such as methyl mercaptan. Other purification methods such as selective but reversible adsorption on solids can be used if a pure mercaptan must be obtained. Mercaptans find use as chemical synthetics, such as in the preparation of vitamins, amino acids such as methionine, drugs, insecticides, and dyes.

The table below presents data obtained from a representative study of runs on the preparation of methyl mercaptan. Runs 1, 2 and 3, at varying catalyst temperatures, show the results obtained when methanol comprises the principal organic feed component and a solid thorium oxide-silica is the catalyst. Although these runs show yields of methyl mercaptan, the catalyst used in run 4, 10% cadmium sulfide on alumina, gives a substantially higher selectivity. In view of the appreciably lower selectivities shown by the thoria catalyst and the corresponding higher percentages (26% to 58%) of dimethyl sulfide obtained as by-product in runs 1, 2, and 3, the data of run 5 is especially adverse. When dimethyl sulfide was employed as feed, such as would be necessary for an economic operation in which it is formed as by-product, little or no formation of methyl mercaptan, the desired product, was given by the thoria catalyst while the cadmium sulfide-alumina catalyst gave a feed conversion of nearly 60%. Thus these data clearly indicate the superiority of this particular catalyst for producing the alkyl mercaptans and especially for producing methyl mercaptan. The cadmium-sulfide-alumina catalyst will give essentially a 100% over-all yield of methyl mercaptan from methanol and hydrogen sulfide in a process in which the by-product dimethyl sulfide is recycled.

TABLE

| Reaction | $MeOH+H_2S \rightleftarrows CH_3SH+H_2O$ | | | $(CH_3)_2S+H_2S$ ↙↗ $(CH_3)_2S+H_2S \rightleftarrows 2CH_3SH$ | | |
|---|---|---|---|---|---|---|
| Run No. | 1 | 2 | 3 | 4 | 5 | 6 |
| Catalyst | $ThO_2$–$SiO_2$ | $ThO_2$–$SiO_2$ | $ThO_2$–$SiO_2$ | $CdS$–$Al_2O_3$ | $ThO_2$–$SiO_2$ | $CdS$–$Al_2O_3$ |
| Degrees C | 360 | 390 | 400 | 390 | 390 | 390 |
| $H_2S$, vol. percent | 50 | 66 | 91 | 90 | 50 | 83 |
| Contact, secs | 5 | 5 | 5 | 9 | 3 | 8 |
| Yield on feed: | | | | | | |
| Mole percent MeSH | 16 | 48+ | 63 | 71 | 6 | 59 |
| Mole percent $Me_2S$ | 58 | 26 | 37 | 29 | | |
| Mole percent $Me_2O$ | 2 | <26 | Trace | 0 | | |
| Feed conversion | 85 | 100 | 100 | 100 | 6 | 59 |
| Selectivity to MeSH | 19 | >48 | 63 | 71 | (100) | 100 |

Example I

As a specific embodiment of the invention, the following experiments for the preparation of the catalyst and its use in converting methyl alcohol and dimethyl sulfide to methyl mercaptan, are presented.

An aqueous solution of solid cadmium chloride of about 20 wt. per cent concentration was employed as the source of cadmium. An active alumina containing about 0.1% sodium oxide by analysis was just moistened with the cadmium chloride solution and dried on a steam bath. The so-treated alumina was then just moistened with an aqueous solution (60%) of sodium sulfide and the catalyst again dried on a steam bath. The alumina with cadmium sulfide precipitated thereon was then washed with water to remove residual sodium chloride, dried, and employed for the preparation of methyl mercaptan in this invention. The resulting catalyst was found to contain approximately 10% by weight of cadmium sulfide.

The cadmium sulfide-activated alumina catalyst prepared as described above was charged to a reactor. A mixture of methyl alcohol and hydrogen sulfide, a ratio of about 1 mole methyl alcohol and 10 moles hydrogen sulfide, was passed over this catalyst at a catalyst temperature of about 390°–400° C. The contact time of the reactants with the catalyst was approximately 9 seconds, the conversion being carried out at atmospheric pressure with both the reactants and products being in a vapor phase. The resulting gaseous reaction mixture was subjected to a distillation in which hydrogen sulfide and methyl mercaptan product were removed from the upper portion of the fractionating column. This mixture can subsequently be separated by fractionation to yield the hydrogen sulfide for recycle to the reactor zone and the methyl mercaptan as essentially pure product. The by-products and unreacted starting materials, dimethyl sulfide, methyl alcohol, and water, are separated, the water being sent to waste and the dimethyl sulfide and methyl alcohol being employed as recycle reactants, advantage being taken of the fact that dimethyl sulfide as well as methyl alcohol is converted to methyl mercaptan by this particular catalyst. Operating essentially as described above, a feed conversion of substantially 100% is obtained with a selectivity of conversion to methyl mercaptan of about 70% to 75%.

Example II

When the above reaction is carried out, employing instead of methyl alcohol, dimethyl sulfide as the starting material, methyl mercaptan is obtained as the chief product; no water is obtained as by-product when methyl alcohol is not present in the starting feed. Dimethyl sulfide, when passed over this cadmium sulfide-activated alumina catalyst, gives a feed conversion of about 60% with a selectivity value of approximately 100%.

What is claimed is:

1. A process for the preparation of methyl mercaptan which comprises passing a reactant mixture comprising dimethyl sulfide and an excess of hydrogen sulfide over a catalyst consisting essentially of cadmium sulfide-alumina containing about 10% by weight of cadmium sulfide at a temperature of approximately 400° C., and recovering methyl mercaptan from the resulting products.

2. A process for conversion of a vapor reaction mixture containing appreciable amounts of a vaporized dialkyl sulfide having from 1 to 8 carbon atoms and an excess of hydrogen sulfide to an alkyl mercaptan, which comprises contacting said reaction mixture in vapor phase at 300°–500° C. with a solid catalyst consisting essentially of cadmium sulfide-alumina containing 2 to 30 per cent by weight of cadmium sulfide, and recovering the resulting mercaptan product.

3. A process for conversion of a vapor reaction mixture containing appreciable amounts of vaporized dimethyl sulfide and an excess of hydrogen sulfide to methyl mercaptan, which comprises contacting said reaction mixture in vapor phase at 390° C. with a solid catalyst consisting essentially of cadmium sulfide-alumina containing 2 to 30 per cent by weight of cadmium sulfide, and recovering the resulting mercaptan product.

LELAND K. BEACH.
ALLAN E. BARNETT.

References Cited in the file of this patent

UNITED STATES PATENTS

| Number | Name | Date |
|---|---|---|
| 2,035,121 | Frolich | Mar. 24, 1936 |
| 2,116,182 | Baur | May 3, 1938 |
| 2,565,195 | Bell | Aug. 21, 1951 |